United States Patent Office 3,031,484
Patented Apr. 24, 1962

3,031,484
PREPARATION OF ORGANIC MERCURY COMPOUNDS
Robert J. Convery, Wilmington, Del., assignor to Sun Oil Company, Philadelphia, Pa., a corporation of New Jersey
No Drawing. Filed Nov. 25, 1959, Ser. No. 855,255
5 Claims. (Cl. 260—431)

This invention relates to the preparation of novel organic mercury compounds which are di(2-acyloxy ethyl mercuri) sulfates and are obtained in the form of powdery solids. By way of example, di(2-acetoxy ethyl mercuri) sulfate in the form of a yellowish white powder is prepared according to the invention.

It is known that ethylene will react with mercury salts of alkanoic acids in the presence of the free alkanoic acid to form 2-acyloxy ethyl mercuri alkanoates. Reactions of this kind have been described in an article appearing in "Chemical Reviews," vol. 48, pages 7–43 (1951).

I have now found that the product from this type of reaction will, under the proper conditions, react with sulfuric acid to form solid compounds which are di(2-acyloxy ethyl mercuri) sulfates. These compounds have utility as fungicides and bactericides.

According to the invention, the new compounds are prepared by first reacting ethylene with a mercuric salt of an alkanoic acid having 1–10 carbon atoms per molecule in the presence of the free alkanoic acid and at a temperature in the range of 0–100° C. which temperature is above the melting point of the acid. A temperature in the range of 20–40° C. preferably is used. This reaction forms the 2-acyloxy ethyl mercuri alkanoate. Sulfuric acid diluted with some of the alkanoic acid is then slowly added to the reaction mixture while it is being agitated at a temperature in the range of 10–50° C., more preferably, 20–40° C. This causes a precipitate to form which is separated from the reaction mixture and constitutes the new type of product, namely, di(2-acyloxy ethyl mercuri) sulfate.

It is important in using the sulfuric acid in the second step described above that it be admixed first with some of the alkanoic acid used before it is added to the reaction mixture; otherwise an undesirable decomposition reaction tends to occur if undiluted sulfuric acid is used. The proportion of sulfuric acid in the mixture used generally should be in the range of 25–75% by weight of the mixture. Also, if the temperature is above 50° C. when the sulfuric acid mixture is added, an undesirable decomposition reaction tends to occur. Hence it is important that the reaction temperature be kept below 50° C. and more preferably at about 20–25° C. except when the alkanoic acid used has a higher melting point.

The above-described reactions are applicable for the mercuric salts of all alkanoic acids having from one to ten carbon atoms per molecule. The term "alkanoic acid" as herein used is intended to include cycloalkanoic acids as well as straight chain and branched chain aliphatic acids. Examples of suitable alkanoic acids are formic, acetic, propionic, butyric, valeric, isovaleric, caproic, caprylic, capric, cyclohexane carboxylic acid, β-cyclopentyl propionic acid and cyclohexyl acetic acid. The mercury salts of any of these acids in admixture with excess acid will readily undergo reaction with ethylene at a temperature above the melting point of the acid and at atmospheric pressure to form the corresponding 2-acyloxy ethyl mercuri alkanoate. For example, when mercuric acetate in glacial acetic acid is reacted with ethylene, the product is 2-acetoxy ethyl mercuri acetate which has the formula:

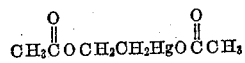

This compound is soluble in the excess acetic acid and hence remains in solution. When concentrated sulfuric acid admixed with glacial acetic acid is added to the solution, a yellowish white precipitate is formed which, as has now been discovered, is di(2-acetoxy ethyl mercuri) sulfate corresponding to the formula:

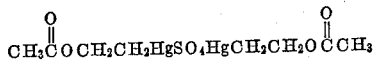

The amount of sulfuric acid added should be approximately the stoichiometric quantity required for this compound or, in other words, an amount which will provide about one atom of sulfur for every two atoms of mercury used. An excess of sulfuric acid may tend to decompose this compound and hence should be avoided.

The following example for making the above specified acetoxy compounds is a specific illustration of the invention:

96 g. of mercuric acetate were mixed with 100 ml. of glacial acetic acid to form a slurry. The mixture was stirred at room temperature and ethylene was bubbled into it. The ethylene reacted exothermically to form 2-acetoxy ethyl mercuri acetate which was soluble in the excess acetic acid. When the reaction was complete, the mixture had become a water white solution. 48 g. of this solution were stirred at room temperature and a mixture composed of 47% by weight of concentrated sulfuric acid (98%) together with glacial acetic acid was added dropwise at room temperature in amount of 25 g. A yellowish white precipitate began to form immediately. After all of the sulfuric acid mixture had been added, the mixture was filtered and the precipitate was washed with glacial acetic acid to remove any sulfuric acid remaining and then with ethyl ether to remove the glacial acetic acid. Thereafter the ether was evaporated from the washed material, leaving about 20 g. of yellowish white powder. Infrared analysis showed the presence of acetate carbonyl groups and the sulfate group. Elemental analysis showed that the product composition checked closely with the theoretical composition for di(2-acetoxy ethyl mercuri) sulfate. This product is water soluble and when heated decomposes before melting. It has fungicidal and bactericidal properties.

When the mercuric salts of other alkanoic acids as specified above are used in place of mercuric acetate, substantially similar results are obtained.

I claim:
1. Method of preparing a di(2-acyloxy ethyl mercuri) sulfate which comprises reacting ethylene with a mercuric salt of an alkanoic acid having 1–10 carbon atoms in admixture with the free alkanoic acid corresponding to the alkanoate portion of said salt at a temperature in the range of 0–100° C. and above the melting point of the acid to form 2-acyloxy ethyl mercuri alkanoate, adding to the resulting crude product mixture at a temperature in the range of 10–50° C. a mixture of sulfuric acid and said alkanoic acid containing 25–75% sulfuric acid by weight, whereby a precipitate forms comprising mainly di(2-acyloxy ethyl mercuri) sulfate, and separating the precipitate from the rest of the reaction mixture.

2. Method according to claim 1 wherein the temperature in each of the reaction steps is in the range of 20–40° C.

3. Method of preparing di(2-acetoxy ethyl mercuri) sulfate which comprises reacting ethylene with mercuric acetate in glacial acetic acid at a temperature in the range of 16–100° C. to form acetoxy ethyl mercuri acetate, adding to the resulting crude product mixture at a temperature in the range of 10–50° C. a mixture of sulfuric acid and glacial acetic acid containing 25–75% sulfuric acid by weight, whereby a powdery precipitate forms comprising mainly di(2-acetoxy ethyl mercuri) sulfate, and separating the precipitate from the rest of the reaction mixture.

4. Method according to claim 3 wherein the temperature in each of the reaction steps is in the range of 20–40° C.

5. Di(2-acetoxy ethyl mercuri) sulfate.

References Cited in the file of this patent

Chemical Reviews, vol. 48 (1951), pages 7 to 43.